CHEMILUMINESCENT PROCESS

Original Filed May 26, 1971 2 Sheets-Sheet 1

INVENTORS
ALAN WARNICK
ALEX D. COLVIN
BY
John P. Faulkner
Glenn S. Arendsen
ATTORNEYS

CHEMILUMINESCENT PROCESS

Original Filed May 26, 1971 2 Sheets-Sheet 2

INVENTORS
ALAN WARNICK
ALEX D. COLVIN
BY
John R. Faulkner
Glenn D. Arendsen
ATTORNEYS

United States Patent

Re. 28,376

Reissued Mar. 25, 1975

28,376

CHEMILUMINESCENT PROCESS

Alan Warnick and Alex D. Colvin, Oak Park, Mich., assignors to Ford Motor Company, Dearborn, Mich.

Original No. 3,746,513, dated July 17, 1973, Ser. No. 146,929, May 26, 1971. Application for reissue Dec. 17, 1973, Ser. No. 425,643

Int. Cl. G01n *27/68*

U.S. Cl. 23—232 R 16 Claims

Matter enclosed in heavy brackets [ ] appears in the original patent but forms no part of this reissue specification; matter printed in italics indicates the additions made by reissue.

ABSTRACT OF THE DISCLOSURE

Concentrations of nitric oxide in gaseous mixtures are determined by measuring the chemiluminescence of the reaction between the nitric oxide and ozone. The gaseous mixture is introduced with virtually laminar flow into a reaction chamber at a location proximate to the inner surface of a light transmitting element. Reaction chamber pressure preferably is maintained above about 5 torr.

BACKGROUND OF THE INVENTION

This invention relates to that of concurrently filed U.S. patent application Colvin et al. Ser. No. 146,927.

Recent interest in reducing the quantity or proportion of harmful constituents in the atmosphere has provided considerable impetus to the development of processes and devices for reducing the amounts of such constituents in exhaust gases from vehicle engines, furnaces, and other power generating equipment. Such development has been hindered because an instrument capable of accurately, efficiently and economically measuring very small quantities of constituents in gaseous mixtures has not been available.

The chemiluminescence of certain reactions has been known for some time and recent investigations have produced instruments capable of utilizing chemiluminescence as an analytical tool. One of such instruments uses the chemiluminescence of the reaction between nitric oxide and ozone to determine the concentration of nitric oxide or ozone in gaseous mixtures by blending the gaseous mixture with a known quantity of the other reactant in a well-stirred reactor at extremely low pressures of one torr or less. A photosensitive device measures the intensity of the resulting chemiluminescence and applies an output signal to a calibrated meter.

Considerable difficulties have been encountered in attempting to utilize that instrument and its technique on a broad basis. Structurally, a large vacuum pump is necessary to produce the extremely low pressures in the reaction chamber and such pumps increase instrument costs to an uneconomical level. The extremely low pressures also accentuate sealing difficulties and necessitate precision manufacturing and assembly procedures. Operationally, transient conditions tend to occur during the well-stirred mixing of the gaseous mixture and the reactant and these transient conditions interfere significantly with reproducibility, sensitivity, and overall accuracy.

SUMMARY OF THE INVENTION

This invention provides a sensitive, accurate, versatile and economical instrument and process for measuring the chemiluminescence of a reaction between a constituent of a gaseous mixture and a gaseous reactant to determine the concentration of the constituent. The invention is useful particularly in measuring the concentration of nitric oxide in a gaseous mixture. Nitric oxide concentrations ranging from a few parts per billion thru several parts per hundred can be measured accurately and efficiently with the invention. Higher pressures are utilized in the invention to improve reproducibility and economic aspects of the instrument. Sensitivity and accuracy are maximized by ignoring the well-stirred reactor techniques of the prior art and emphasizing instead a technique that maintains a substantially stable portion of the reaction as close as possible to a light sensing device.

An instrument for carrying out the invention comprises a reaction chamber having an opening at one end with a light transmitting element sealingly mounted in the opening. A sample conduit for supplying the gaseous mixture to the reaction chamber opens into the reaction chamber at a location proximate to the inner surface of the light transmitting element. A reactant conduit supplies to the reaction chamber a gaseous reactant capable of reacting with a constituent of the sample mixture in a manner that produces chemiluminescence. An exhaust conduit removes the reaction products from the reaction chamber. A light sensing device such as a photomultiplier tube is connected to the reaction chamber where it receives the light passing through the light transmitting element produces accurate, continuous readtaking place within the chamber.

The invention is highly suited to measuring the concentration of nitric oxide in a gaseous sample mixture by reacting the nitric oxide with ozone. Such sample mixture enters the reaction chamber through the sample conduit and a gaseous reactant mixture containing at least a predetermined minimum amount of ozone enters the reaction chamber through the reaction conduit. Reaction begins immediately and a portion of the reaction that depends on the concentration of the nitric oxide in the sample mixture occurs within a short distance of the light transmitting element. Continuously flowing the gaseous mixtures into the reaction chamber and measuring the chemiluminescence transmitted through the light transmitting element produces accurate, continuous readouts over a wide range of nitric oxide concentrations.

Pressure in the reaction chamber must be sufficiently high to avoid excess turbulence and to promote uniform reaction proximate to the light sensing device. Best results are achieved when the absolute pressure in the reaction chamber is maintained above about 5 torr with preferred pressure ranging above 300 torr, because the gases then enter and flow through the reaction chamber with virtually laminar flow. The smooth, stable reaction reduces transient mixing variations and the resulting variations in the light reaching the light sensing device. Such higher pressures also increase the reaction rate and thereby maintain a greater portion of the reaction proximate to the light sensing device. The resulting increase in light intensity further improves accuracy and sensitivity. Reaction chamber pressures approximating atmospheric pressure can be used if desired.

An exhaust pump can be connected to an exhaust outlet of the reaction chamber to draw the sample mixture and the reactant mixture through the reaction chamber. Metering devices then are included in the sample conduit and the reactant conduit; such metering devices typically are fine capillary tubes that are located a sufficient distance upstream of the reaction chamber to permit dissipation of any turbulence produced thereby. If operation above atmospheric pressure is desired, pumps are included in the sample conduit and the reactant conduit and the exhaust outlet is connected to the atmosphere through an appropriate metering device.

Optimized flow rates of the sample mixture and the reactant mixture depend on the quantity and nature of the other constituents in the gaseous mixtures, assuming of course that the proportions of the reactants are within a predetermined range. Carbon dioxide for example has a quenching effect on the emitted chemiluminescence of the nitric oxde and ozone reaction approximately 2–3 times that of oxygen, which usually forms the greater portion of the ozone containing reactant mixture. The quenching effect is minimized in sample mixtures containing a high proportion of carbon dioxide by providing relatively high flow of the reactant mixture to insure a high ratio of oxygen to carbon dioxide in the reaction chamber. Thus, best results are achieved when analyzing automotive exhaust gases (which contain a high proportion of carbon dioxide) by providing about 4 volumes of reactant mixture for each volume of sample mixture, while analyzing atmospheric sample mixtures preferably is conducted with about 4 volumes of sample mixture for each volume of reactant mixture. Analysis of most other mixtures can be performed within these ratios.

For the nitric oxide-ozone reactions, the light transmitting element and the light sensing device preferably transmit and measure light in a broad portion of the spectrum including wavelengths between about 6400 Angstroms and 25,000 Angstroms. Improved results can be achieved by measuring light having wavelengths of about 6400–15,000 Angstroms only. Spurious noise is minimized further by measuring light having wavelengths of about 10,000–14,000 Angstroms only.

A cylindrical housing serves preferably as the reaction chamber. A disc-shaped light transmitting element is mounted sealingly in one end of the cylindrical housing and the other end is closed except for the exhaust outlet. The sample conduit extends through the cylindrical wall of the housing and opens into the reaction chamber at a location proximate to the light transmitting element. Reactant preferably is introduced into the reaction chamber from a reactant conduit opening adjacent the sample conduit opening or between the sample conduit opening and the exhaust outlet.

DETAILED DESCRIPTION

Figure 1:
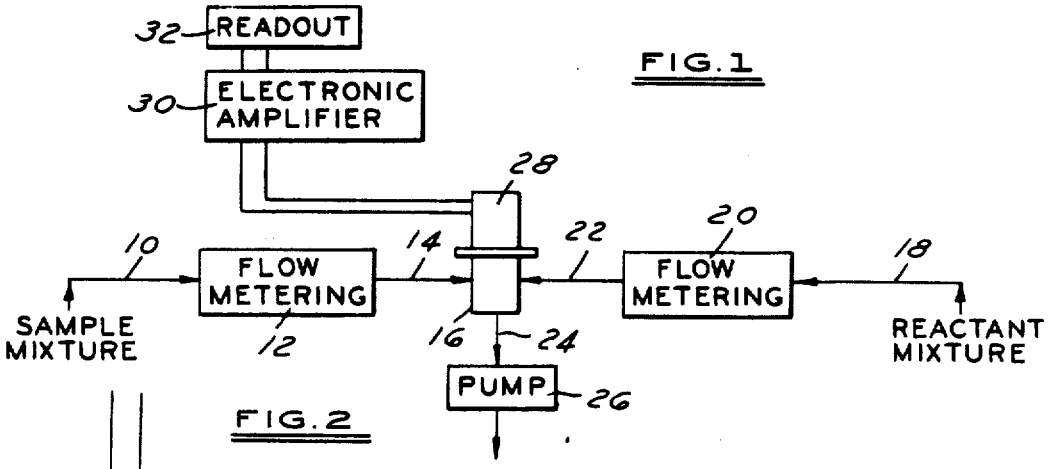
FIG. 1 is a schematic illustrating the basic structural and operational principles of the invention.
Figure 2:
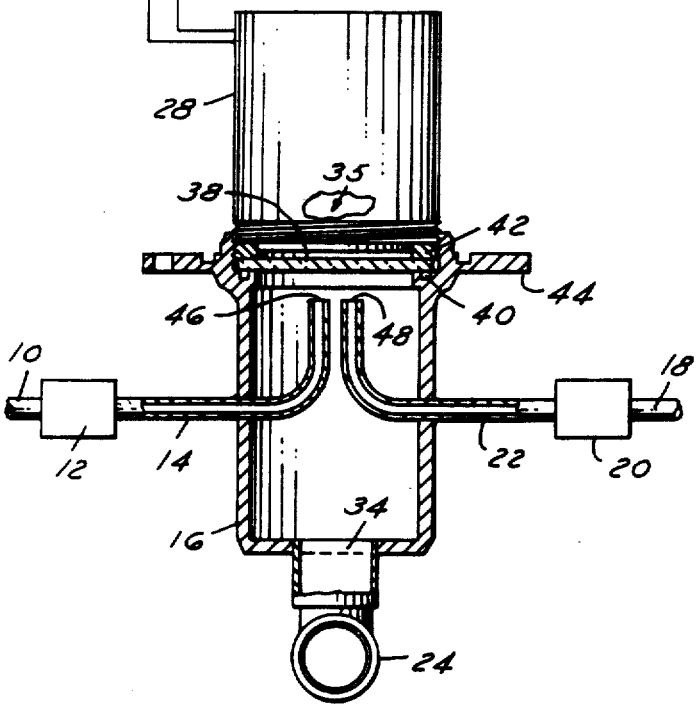
FIG. 2 is a partially sectioned view through a reaction chamber for the instrument in which smoothly curved conduits introduce both the sample mixture and the reactant into the reaction chamber at a location proximate to the central portion of a light transmitting element.
Figure 3:
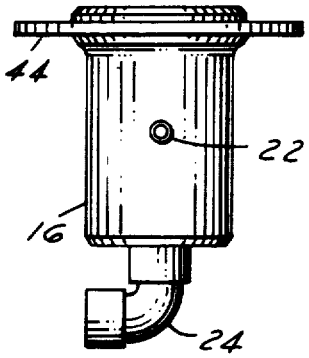
FIG. 3 is an elevation of the reaction chamber shown in FIG. 2.

Referring to FIGS. 1–3, a gaseous sample mixture containing an unknown quantity of nitric oxide is conducted by conduit 10 to a capillary type flow metering device 12. A sample conduit 14 introduces the sample mixture leaving the flow metering device into a cylindrical reaction chamber 16. A conduit 18 conduits a gaseous reactant mixture containing at least a predetermined minimum amount of ozone to a capillary type flow metering device 20 and a reactant conduit 22 introduces the reactant leaving the flow metering device into reaction chamber 16. One end of reaction chamber 16 has an outlet fitting 24 attached thereto and a vacuum pump 26 is connected to fitting 24. A photomultiplier device 28 is mounted on the other end of reaction chamber 16 and is connected electrically through an amplifier 30 and other appropriate electronic circuitry to a readout device 32.

Outlet fitting 24 communicates with the interior of reaction chamber 16 through an opening 34 in an end wall thereof (FIG. 2). A disc-shaped light transmitting element 38 closes the entire opposite end 35 of the chamber so that outlet fitting 24 is axially removed from element 38. The housing of photomultipleir device 28 is threaded into the reaction chamber to maintain element 38 in place. Appropriate seals 40 and 42 assure gas tight installation of element 38 in opening 35. A flange 44 provides for fastening the assembly of reaction chamber 16 and photomultiplier device 28 to supporting structure (not shown).

Sample conduit 14 extends through the cylindrical wall of chamber 16 approximately at its longitudinal midpoint and curves smoothly toward light transmitting element 38 so the opening 46 at the end of the sample conduit is proximate to the inner surface of element 38. Reactant conduit 22 extends through the cylindrical wall of reaction chamber 16 at a location diametrically opposed to conduit 14 and conduit 22 also curves smoothly toward light transmitting element 38 so the opening 48 at its end also is proximate to the inner surface of element 38. Opening 48 is in the same plane as opening 46 and is adjacent to opening 46. Both openings 46 and 48 are located in the central portion of reaction chamber 16 and both are located axially between light transmitting element 38 and exhaust opening 34.

Reaction chamber 16 typically is about 2 inches in diameter and about 3 inches long. Conduits 14 and 22 have an inside diameter of about ⅛ inch and a wall thickness of about 1/16 inch. Element 38 is a glass optical filter capable of transmitting light in at least the dark red portion of the visible region and the infrared region (above about 6400 Angstrom units). Openings 46 and 48 are about ¼ inch from the inner surface of element 38 and are spaced apart about ¼ inch.

Instrument operation occurs in the following manner. Pump 26 is started and capillary metering devices 12 and 20 are selected so the subatmospheric pressure within reaction chamber 16 reaches some predetermined value. Good results are achieved when the predetermined value of pressure is at least about 5 torr. A reactant mixture containing about 2 percent ozone and 98 percent oxygen is supplied to reactant conduit 18. As sample mixture flows into reaction chamber 16 through opening 46, nitric oxide molecules in the sample mixture react with ozone molecules in the reactant mixture to produce chemiluminescence in an amount proportional to the concentration of the nitric oxide in the gaseous mixture.

Both the sample mixture and the reactant mixture flow into the reaction chamber with substantially laminar flow. In the reaction chamber, the mixtures blend with each other and pass through the reaction chamber with a minimum of turbulence. This stability provides a high degree of reproducibility and sensitivity.

Light from the chemiluminescence passes through element 38 and its intensity is detected by photomultiplier device 28. An electronic signal representing the intensity is transmitted to electronic amplifier 30 which in turn applies an output signal to readout device 32 that is calibrated to read directly in units representing the concentration of nitric oxide in the gaseous mixture.

Accuracy and sensitivity are maximized when a considerable portion of the reaction between the nitric oxide and the ozone occurs proximately to the inner surface of element 38. Sample conduit 46 in fact directs the sample mixture toward the light transmitting element as the mixture enters the reaction chamber. The reaction continues as the reacting compositions move through reaction chamber 16 toward exhaust opening 36 but the intensity of the light received by light sensing device 28 diminishes with the decreasing solid angle subtended by light transmitting element 38.

Increased reaction rates can be achieved by raising the pressure in the reaction chamber since the higher pressure increases the number of molecules of nitric oxide and ozone in the chamber and thereby increases the probability of molecule collision. Highly accurate results with excellent sensitivity are achieved by raising the reaction chamber pressure to at least about 300 torr. Such higher pressures permit the gaseous mixture and the reactant to enter the reaction chamber with an improved laminar type flow that diminishes transient variations in the light intensity resulting from nonuniform mixing within the reaction chamber.

Figure 4:
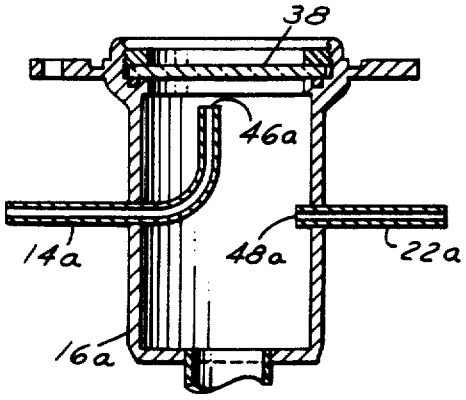
FIG. 4 is a cross section of an alternate reaction chamber design in which a smoothly curved conduit introduces the sample mixture at a location proximate to the central portion of the light transmitting element and a straight conduit introduces the reactant into the reaction chamber at a location between the sample mixture outlet and the exhaust conduit.

In the reaction chamber of FIG. 4, sample conduit 14a is similar to that of FIG. 2 but a straight reactant conduit 22a terminates a short distance just inside the cylindrical wall of the reaction chamber so that its opening 48a is directed radially inward in a plane located axially between the sample conduit opening and the exhaust conduit opening. Conduit 22a preferably enters the chamber within about one half of the axial length of the chamber from light transmitting element 38. Comparative tests with a FIG. 4 reaction chamber 3 inches long and having conduit 22a 1.5 inches from element 38 indicate slight increases in measurable light intensity over the FIG. 2 chamber.

Figure 5:
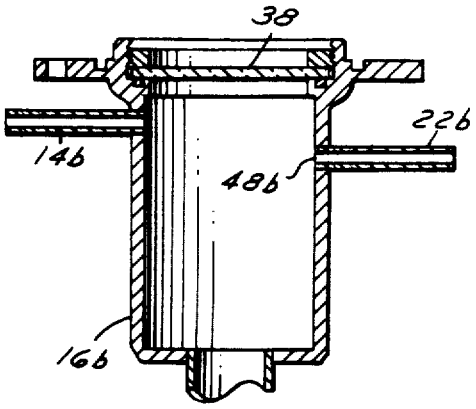
FIG. 5 is a cross section of a reaction chamber in which a straight conduit introduces the sample mixture into the reaction chamber at a location closely adjacent an edge of the light transmitting element and another straight conduit introduces the reactant at a location diametrically across from the mixture outlet and axially removed therefrom toward the exhaust conduit. The reaction chamber of FIG. 6 is a similar to that of FIG. 5 except that the reactant enters the chamber on the same side as the sample mixture.

In the reaction chamber of FIG. 5, the location of reactant conduit 22b is similar to that of FIG. 4. Sample conduit 14b is straight and extends radially into the chamber at a location closely adjacent an edge of light transmitting element 38. Openings 48b of the reactant conduit is diametrically across and axially displaced toward the exhaust opening from the opening of the sample conduit. In comparative tests with the FIG. 2 reaction chamber, the FIG. 5 arrangement also produced slight increases in measurable light intensity.

Figure 6:
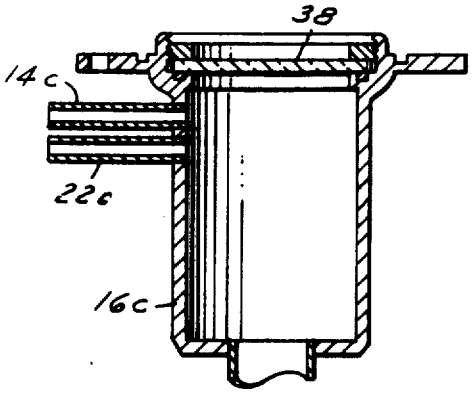
Figure 7:
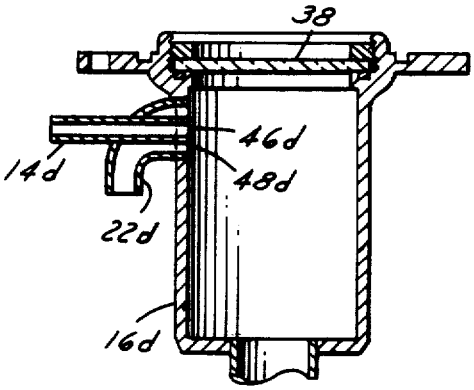
FIG. 7 shows another reaction chamber in which the reactant enters the reaction chamber through an annular conduit that surrounds the sample conduit.

Both conduits enter the reaction chambers of FIGS. 6 and 7 on the same side. In FIG. 6, the location of sample conduit 14c is similar to that of FIG. 5 while reactant conduit 22c is displaced axially therefrom toward the exhaust opening. In FIG. 7, sample conduit 14d extends straight into the reaction chamber and reactant conduit 22d surrounds the sample conduit so the reactant conduit forms an annular opening 48d.

In each of these reaction chambers, the sample conduit is proximate to the light sensing assembly to promote reaction proximate thereto. Each of the disclosed reaction chamber constructions and similar constructions produce useful results although the best combination of accuracy and sensitivity has been achieved to date with the chambers of FIGS. 2, 4 and 5.

Flow metering devices 12 and 20 preferably are at least several inches upstream from the respective conduit openings to permit dissipation of any turbulence produced thereby. The use of capillary tubes as the metering devices provides stable metering and minimal turbulence. Appropriate converters can be included in the sample conduit to convert other oxides of nitrogen into nitric oxide and thereby permit using the invention to provide the total concentration of oxides of nitrogen in the sample mixture. An ozone killer can be included between the reaction chamber and the pump to increase the life of rubber seals and other rubber pump components. Other light sensing devices capable of responding to light having the aforementioned wavelengths can be substituted for the photomultiplier device.

Thus this invention provides improved structures and techniques for accurately and conveniently determining the concentrations of gases such as nitric oxide in a gaseous mixture. The invention has greatly improved sensitivity, reproducibility, and economy of construction and operation.

1. A process for determining the concentration of a gaseous constituent in a gaseous sample mixture by measuring the [chemiluminescent] *chemiluminescence* of a reaction between the constituent and a gaseous reactant in a reaction chamber comprising introducing the gaseous sample mixture into the reaction chamber with substantially laminar flow at a location proximate to light transmitting means forming at least a portion of a wall of the reaction chamber, separately introducing a gaseous reactant capable of producing chemiluminescence when reacting with the constituent into the reaction chamber *at a location proximate to the point of introduction of the gaseous sample mixure,* drawing the gaseous mixture *of sample and reactant* away from the location at which it is introduced into the reaction chamber, and measuring the chemiluminescence transmitted through the light transmitting means that is produced by the reaction between the constituent and the reactant.

2. The process of claim 1 in which the reactant is included in a gaseous reactant mixture that is introduced into the reaction chamber with substantially laminar flow

3. The process of claim 2 in which the gaseous mixtures blend smoothly with each other within the reaction chamber as the mixtures are drawn substantially perpendicularly away from the light transmitting means.

4. The process of claim 3 in which the sample mixture is introduced into the reaction chamber at a location closely adjacent the light transmitting means.

5. The process of claim 4 in which the reactant mixture is introduced into the reaction chamber at a location positioned across at least a portion of the light transmitting means from the location at which the sample mixture is introduced.

6. The process of claim 5 comprising maintaining the pressure in the reaction chamber above about 5 torr.

7. The process of claim 6 comprising maintaining the pressure in the reaction chamber above about 300 torr.

8. The process of claim 7 in which the gaseous mixture is introduced into the reaction chamber at the central portion of the light transmitting means, said gaseous mixture being directed toward the light transmitting means at its introduction into the reaction chamber.

9. The process of claim 7 in which the sample mixture is introduced into the reaction chamber at one side of the light transmitting means, said sample mixture flowing substantially parallel to the light transmitting means at its introduction into the reaction chamber.

10. The process of claim 9 comprising maintaining the relative flow rates of the sample mixture and the reactant mixture within a range of about 4:1 to 1:4.

11. The process of claim 1 comprising maintaining the pressure in the reaction chamber above about 5 torr.

12. The process of claim 1 comprising maintaining the pressure in the reaction chamber above about 300 torr.

13. The process of claim 1 in which the gaseous mixture is introduced into the reaction chamber at the central portion of the light transmitting means, said gaseous mixture being directed toward the light transmitting means at its introduction into the reaction chamber.

14. The process of claim 1 in which the sample mixture is introduced into the reaction chamber at one side of the light transmitting means, said sample mixture flowing substantially parallel to the light transmitting means at its introduction into the reaction chamber.

15. The process of claim 1 comprising maintaining the relative flow rates of the sample mixture and the reactant mixture within a range of about 4:1 to 1:4.

16. The process of claim 1 in which the sample mixture is introduced into the reaction chamber at a location closely adjacent the light transmitting means.

References Cited

The following references, cited by the Examiner, are of record in the patented file of this patent or the original patent.

UNITED STATES PATENTS

| | | | |
|---|---|---|---|
| 3,245,758 | 4/1966 | Benzinger et al. | 23—230 |
| 3,285,703 | 11/1966 | Narita et al. | 23—254 |
| 3,287,089 | 11/1966 | Wilburn | 23—254 |

| | | | |
|---|---|---|---|
| 3,520,660 | 7/1970 | Webb | 23—253 |
| 3,615,241 | 10/1971 | Low | 23—253 |
| 3,647,387 | 3/1972 | Benson et al. | 23—254 |

OTHER REFERENCES

Warren et al.: "Portable Ethylene Chemiluminescence Ozone Monitor," Rev. Scient. Instr., vol. 41, pp. 280–282 (1970).

R. E. SERWIN, Primary Examiner

U.S. Cl. X.R.

23—230 PC, 232 E